United States Patent [19]

Yamashita et al.

[11] Patent Number: 4,658,792
[45] Date of Patent: Apr. 21, 1987

[54] FUEL INJECTION SYSTEM FOR INTERNAL COMBUSTION ENGINE

[75] Inventors: Akinori Yamashita; Kenji Hataoka; Noboru Hashimoto; Masanori Misumi, all of Hiroshima, Japan

[73] Assignee: Mazda Motor Corporation, Japan

[21] Appl. No.: 725,671

[22] Filed: Apr. 22, 1985

[30] Foreign Application Priority Data

Apr. 27, 1984 [JP] Japan ................. 59-85725

[51] Int. Cl.$^4$ ........................... F02M 51/00
[52] U.S. Cl. .................... 123/478; 123/308; 123/430; 123/445; 123/661
[58] Field of Search ............ 123/306, 308, 432, 438, 123/430, 445, 478, 501, 502, 661

[56] References Cited

U.S. PATENT DOCUMENTS

| | | | |
|---|---|---|---|
| 3,267,921 | 8/1966 | Whitehurst | 123/445 X |
| 4,052,973 | 10/1977 | Clauser | 123/445 X |
| 4,366,789 | 1/1983 | Eckert | 123/661 X |
| 4,478,190 | 10/1984 | Kawai | 123/478 |
| 4,543,931 | 1/1985 | Hitomi et al. | 123/661 X |

FOREIGN PATENT DOCUMENTS 0148636 11/1981 Japan .
0193717 11/1982 Japan ................. 123/661
0085319 5/1983 Japan .

*Primary Examiner*—Willis R. Wolfe, Jr.
*Attorney, Agent, or Firm*—Gerald J. Ferguson, Jr.; Ronni S. Malamud; Michael P. Hoffman

[57] ABSTRACT

The combustion chamber for an internal combustion engine is formed by a main combustion chamber defined by a recess formed in a part of the lower face of a cylinder head and a squish zone which is a narrow space formed between the top surface of the piston in the top dead center and the substantially flat portion of the lower surface of the cylinder head around the recess. A spark plug is disposed in a position near the squish zone. A fuel injection valve is provided to inject fuel into an intake passage communicated with the combustion chamber by way of an intake valve. The fuel injection valve is controlled, at least when the engine load is low, to inject fuel by an amount required for one power stroke and to terminate fuel injection before the middle of the intake valve opening time at latest so that stratification of air and fuel can be obtained in which rich mixture is accumulated in the lower portion of the combustion chamber and lean mixture in the upper portion of the same.

13 Claims, 10 Drawing Figures

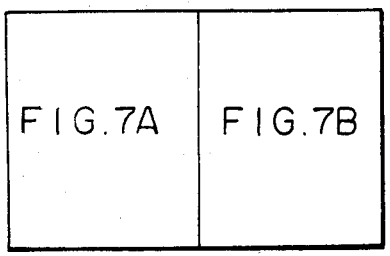
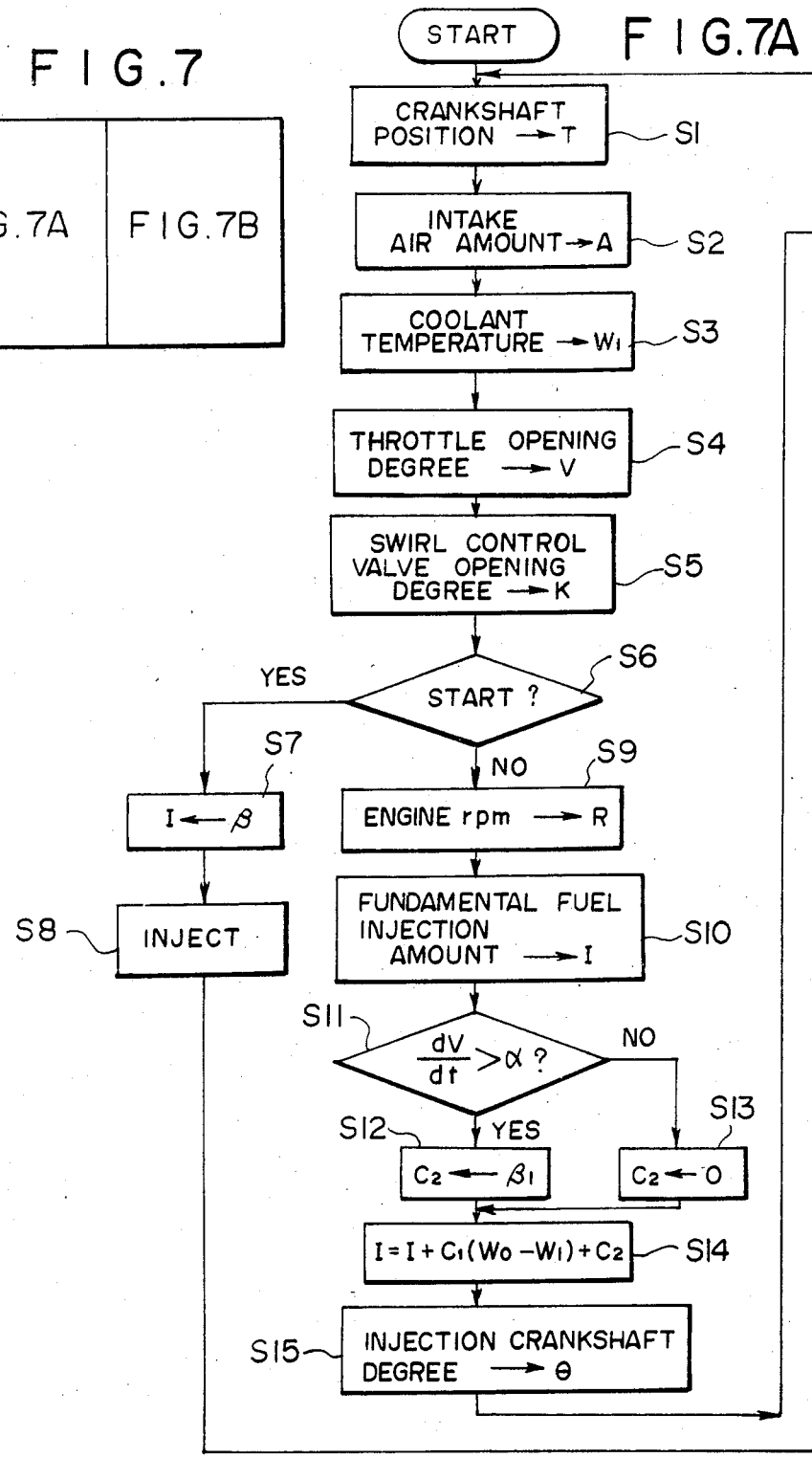

FUEL INJECTION SYSTEM FOR INTERNAL COMBUSTION ENGINE

BACKGROUND OF THE INVENTION

1. Field of the Invention

This invention relates to a fuel injection system for an internal combustion engine, and more particularly to a fuel injection system for an internal combustion engine in which so-called stratified charge is accomplished at least during light load operation of the engine.

2. Description of the Prior Art

There has been known a stratified charge technique in which a fuel injection valve is provided in an intake passage and fuel is injected in the latter half of the intake stroke during light load operation of the engine so that rich air-fuel mixture surrounds the spark plug and lean air-fuel mixture surrounds the rich mixture, and so that the air-fuel mixture is given a swirling motion as it enters the combustion chamber, thereby suppressing diffusion of the stratified fuel in the compression stroke. See Japanese Unexamined Patent Publication Nos. 56(1981)-148636 and 58(1983)-85319, for example.

In the stratified charge, the mixture near the spark plug must be rich enough to be ignited by the spark plug, but the mixture remote from the spark plug may be very lean. Thus the stratified charge is advantageous in that the overall airfuel ratio may be lean and accordingly the fuel economy can be improved and exhaust emissions can be reduced. Further, in the stratified charge, the mixture in the end gas zone is lean and hard to ignite and accordingly spark knock can be prevented.

On the other hand, there has been proposed a novel internal combustion engine in which a recess is formed in the cylinder head at a portion circumscribing the spark plug and one of the intake port and the exhaust port, and a combustion chamber is formed by the recess and a squish zone formed between the inner surface of the cylinder head and the top surface of the piston in the top dead center, the recess forming a main combustion chamber. In this engine, the burning rate can be increased by virtue of the substantially spherical and compact main combustion chamber and thereby stability in combustion can be improved.

When said stratified charge is applied to the engine, there arises a problem that a squish flow is produced in the combustion chamber as the piston moves upward and fuel accumulated around the spark plug is scattered by the squish flow to break up the stratification.

SUMMARY OF THE INVENTION

In view of the foregoing observations and description, the primary object of the present invention is to provide a fuel injection system for an internal combustion engine having a main combustion chamber formed by a recess at a part of the wall of the cylinder head defining the cylinder in which the advantage of said stratified charge can be enjoyed.

In accordance with the present invention, the combustion chamber for an internal combustion engine is formed by a main combustion chamber defined by a recess formed in a part of the lower face of a cylinder head and a squish zone which is a narrow space formed between the top surface of the piston in the top dead center and the substantially flat portion of the lower surface of the cylinder head around the recess. A spark plug is disposed in a position near the squish zone. A fuel injection valve is provided to inject fuel into a intake passage communicated with the combustion chamber by way of an intake valve. The fuel injection valve is controlled, at least when the engine load is low, to inject fuel by an amount required for one power stroke and to terminate fuel injection before the middle of the intake valve opening time at latest so that stratification of air and fuel can be obtained in which rich mixture is accumulated in the lower portion of the combustion chamber and lean mixture in the upper portion of the same.

In accordance with the fuel injection system of the present invention, at least when the engine load is low, stratified-charge is accomplished to improve the fuel economy and to reduce exhaust emissions. Since the spark plug is near the squish zone to be subjected to squish flow, the spark plug can be provided with rich mixture when ignited even if squish flow is produced and disturbs the stratification. At the same time, the combustion wave flows into the main combustion chamber riding the squish flow, thereby improving the burning rate to shorten the combustion time and to improve stability in combustion.

Insofar as the spark plug is subjected to the squish flow, it does not have to be positioned near the squish zone. Therefore, in this specification, the term "a position near the squish zone" should be broadly interpreted to include positions along the path of the squish flow but relatively remote from the squish zone.

BRIEF DESCRIPTION OF THE DRAWINGS

FIGS. 7, 7A and 7B are a flow chart for illustrating the operation of the control device.

DESCRIPTION OF THE PREFERRED EMBODIMENT

Figure 1:
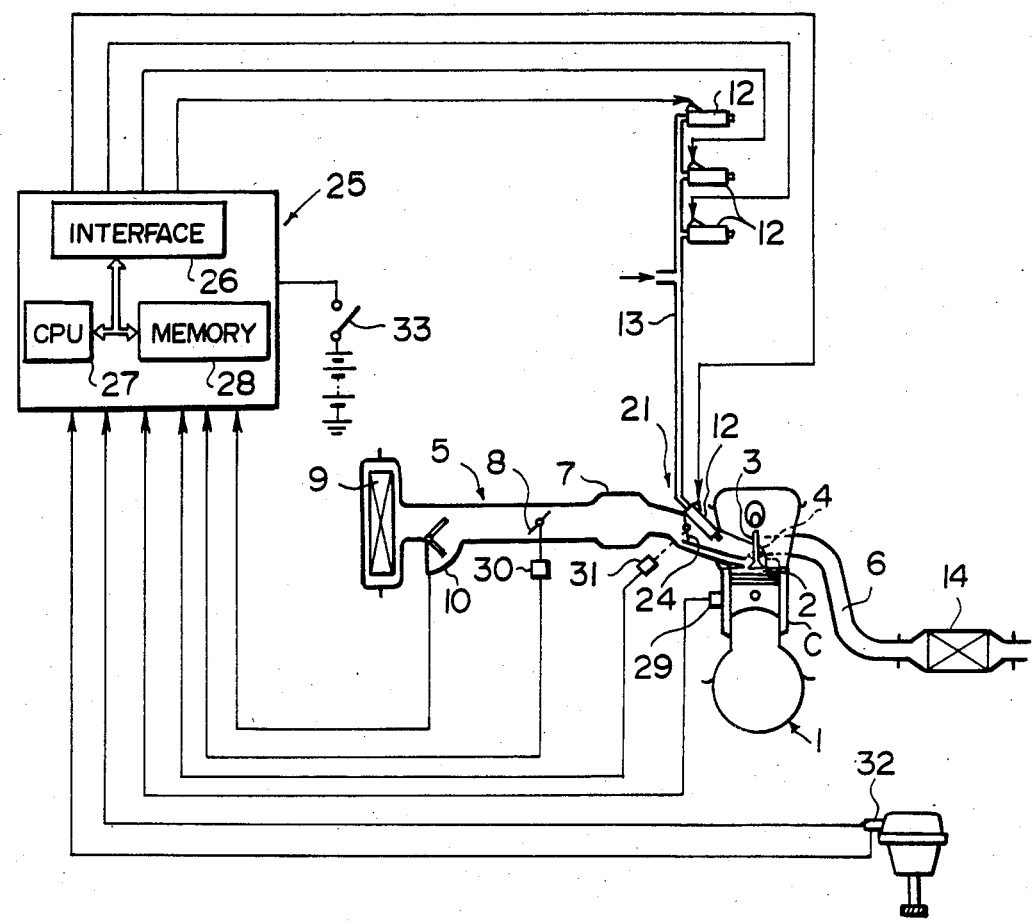
FIG. 1 is a schematic view for illustrating an internal combustion engine provided with a fuel injection system in accordance with an embodiment of the present invention.

In FIG. 1, an internal combustion engine 1 in accordance with an embodiment of the present invention has first to fourth cylinders C (only one of them is shown in FIG. 1). To a combustion chamber 2 formed in each cylinder C, are connected an intake passage 5 and an exhaust passage 6 respectively by way of an intake valve 3 and an exhaust valve 4. The intake passage 5 is provided with a surge tank 7, a throttle valve 8 disposed upstream of the surge tank 7, an air cleaner 9 connected to the upstream end of the intake passage 5, and an airflow meter 10 disposed between the throttle valve 8 and the air cleaner 9 to detect flow of intake air. In the downstream portion of the intake passage 5 is provided a fuel injection valve 12 directed to the intake valve 3. The fuel injection valve 12 is connected to a fuel supply line 13 which is connected to a fuel reservoir (not shown) by way of a fuel pressure regulator (not shown). To the fuel injection valve 12 is imparted a fuel pressure which is controlled by the fuel pressure regulator so that the pressure difference between the fuel pressure and the pressure in the intake passage is kept constant. The exhaust passage 6 is provided with a catalytic converter 14.

Figure 3:
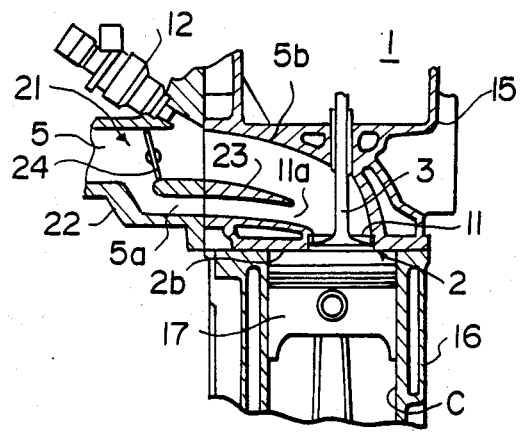
FIG. 3 is a fragmentary cross-sectional view taken along line III—III in FIG. 2.
Figure 4:
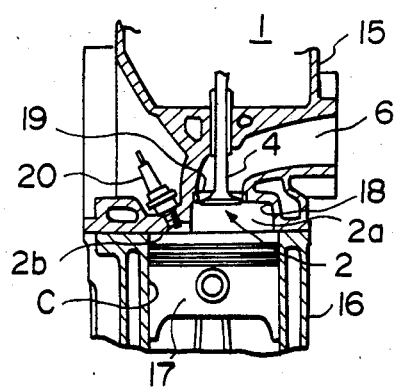
FIG. 4 is a fragmentary cross-sectional view taken along line IV—IV in FIG. 2.

Now, the structure of the intake passage 5 and the combustion chamber 2 will be described in detail with reference to FIGS. 2 to 4. A substantially oval recess 18 is formed in the bottom face of a cylinder head 15 mounted on a cylinder block 16 at a portion opposed to a piston 17 and the combustion chamber 2 defined between the inner wall of the cylinder head 15 and the top face of the piston 17 when the piston 17 is at the top dead center comprises a main combustion chamber 2a defined by the recess 18 and a squish zone 2b which is the fine space formed between the top face of the piston 17 and the portion of the bottom face of the cylinder head 15 surrounding the recess 18.

An exhaust port 19 communicated with the exhaust passage 6 opens in the recess 18 forming the main combustion chamber 2a and an intake port 11 communicated with the intake passage 5 opens in the squish zone 2b. The intake valve 3 and the exhaust valve 4 are mounted to open and close the intake port 18 and the exhaust port 19, respectively A spark plug 20 is mounted to face the squish zone 2b near the recess 18.

The intake passage 5 is arranged to give the mixture introduced into the combustion chamber 2 a swirling motion in the circumferential direction of the cylinder C forming the combustion chamber 2. Further the intake passage 5 is provided with a swirl controlling device 21 for controlling the swirling motion to be given to the mixture. In FIGS. 2 and 3, reference numeral 22 denotes an intake manifold. The downstream end portion of each intake passage 5 is formed by the intake manifold 22 and the cylinder head 15. The downstream end portion of the intake passage 5 is bifurcated into a primary intake passage 5a and a secondary intake passage 5b by a partition wall 23 extending from the cylinder head 15 into the intake manifold 22. In the secondary intake passage 5b is provided a swirl control valve 24. The swirl control valve 24 is basically driven by an actuator (not shown) according to increase and reduction in the amount of intake air, and is closed during light load operation of the engine 1 and opened during heavy load operation. This arrangement constitutes the aforesaid swirl controlling device 21.

Figure 2:
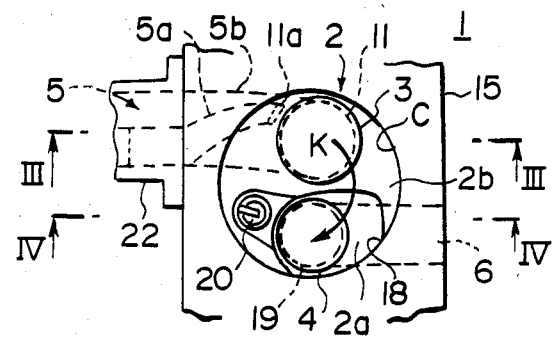
FIG. 2 is fragmentary bottom view of the cylinder head employed in the engine shown in FIG. 1.

The primary intake passage 5a has a relatively small cross-sectional area and opens slightly upstream of the intake valve 3 as a swirl port 11a a directed in the circumferential direction of the cylinder C (FIG. 3), thereby increasing the flow speed of intake air and reducing the angle at which the intake air is introduced into the combustion chamber 2 with respect to the top face of a piston 20 so that the intake air is given a swirling motion in the circumferential direction of the cylinder C as shown by the arrow K in FIG. 2.

The secondary intake passage 5b is directed substantially in parallel to the central axis of the cylinder C toward the top face of the piston 20 to give the intake air little swirling motion.

When the swirl control valve 24 is closed (the opening degree is 0°), the intake air is introduced into the combustion chamber 2 only through the primary intake passage 5a and accordingly the intake air is given a large or strong swirling motion. As the swirl control valve 24 is opened or as the opening degree of the swirl control valve 24 is increased, the ratio of the amount of intake air introduced through the secondary intake passage 5b to that of intake air introduced through the primary intake passage 5a is increased, and therefore the swirling motion of the overall intake air in the combustion chamber 2 becomes smaller. When the swirl control valve 24 is full opened (the opening degree is 70°), swirling motion of the intake air is little produced.

Figure 5:
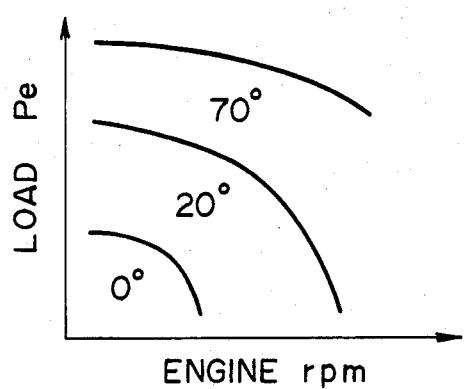
FIG. 5 is a view for illustrating the opening degree characteristics of the swirl control valve employed in the engine shown in FIG. 1.

The swirl control valve 24 is opened and closed by an actuator (not shown) which may comprise, for instance, a diaphragm driven in response to intake vacuum or exhaust pressure. The opening degree of the swirl control valve 24 is controlled corresponding to change in the amount of intake air, i.e. change in the engine rpm and the engine load. In this particular embodiment, as shown in FIG. 5, the opening degree of the swirl control valve 24 is set at 0° (fully closed) in the low-load low-speed range so that a large swirling motion is given to the intake air, at 70° in the high-load high-speed range to suppress production of the swirling motion, and at 20° in the middle-load middle-speed range to produce a relatively small or weak swirling motion. Further, by opening the swirl control valve 24 when the amount of intake air is increased, reduction in the volumetric efficiency due to resistance of the swirl control valve 24 to the intake air can be limited.

Said fuel injection valve 12 is provided in the intake passage 5 downstream of the swirl control valve 24 to inject fuel toward the combustion chamber 2 from a position relatively near the intake port 11 so that the fuel injected from the fuel injection valve 12 is directly introduced into the combustion chamber 2 though the intake port 11.

The fuel injection timing and the fuel injection amount by the fuel injection valve 12 are controlled by a fuel injection pulse to be delivered to the fuel injection valve 12 from a control device 25 as shown in FIG. 1.

The control device 25 comprises an interface 26, a CPU 27 and a memory 28. In the memory 28, an operational program for the CPU 27 shown in FIG. 7 and the like are stored. To the control device 25 are input an intake-air-amount signal from the airflow meter 10, an engine-coolant-temperature signal from a coolant temperature sensor 29 for detecting the temperature of engine coolant, a throttle-opening-degree signal from a throttle position sensor 30 for detecting accelerating condition through change in the opening degree of the throttle valve 8, a swirl-control-valve-opening-degree signal from a swirl-control-valve-position sensor 31 for detecting the opening degree of the swirl control valve 24 and a crankshaft-position signal from a crankshaft sensor 32 for detecting the crankshaft angle of the engine 1 and the top dead center (TDC) of the first cylinder through the angular position of the distributor. Reference numeral 33 denotes a ignition switch.

The CPU 27 of the control device 25 determines a fundamental fuel injection amount according to the engine rpm and the amount of intake air, and corrects the fundamental fuel injection amount to increase the amount to be actually injected when the engine 1 is cold, or when the engine 1 is accelerated, for instance. When the engine load is low, the CPU 27 controls the fuel injection valve 12 to effect the stratified charge. That is, the CPU 27 determines the amount of fuel to be injected for one power stroke and the fuel injection valve timing suitable for effecting the stratified charge, and delivers a fuel injection pulse according to the determination. More particularly, when the engine load is low, the CPU 27 controls the fuel injection valve 12 so that injection of an amount of fuel required for one power stroke is completed by the end of the first half of the intake valve opening period at latest.

Figure 6A:
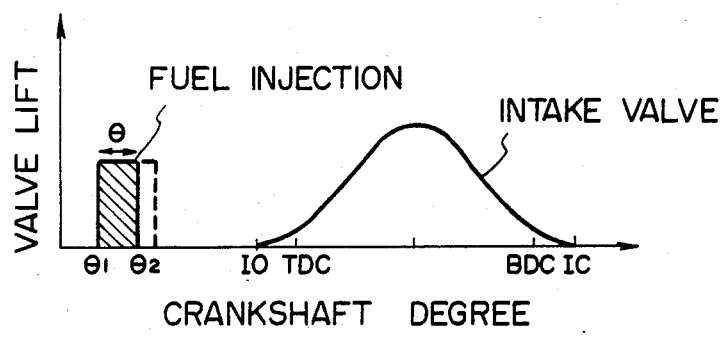
FIG. 6a is a timing chart for illustrating an example of the fuel injection timing when the stratified charge is to be effected.
Figure 6B:
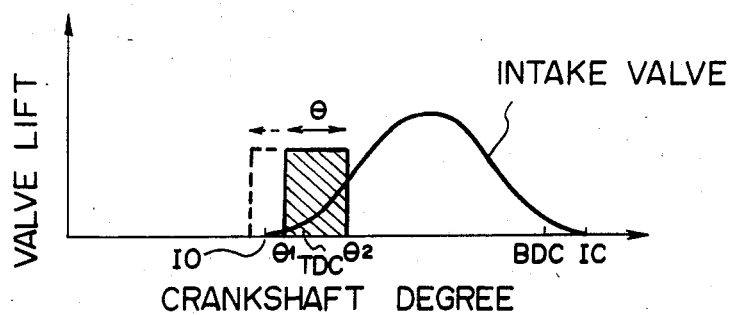
FIG. 6b is a timing chart for illustrating another example of the fuel injection timing when the stratified charge is to be effected.

That is, in order to effect the stratified charge in accordance with the present invention, fuel injection should be completed by the end of the first half of the intake stroke at latest. For example, the fuel injection timing can be determined in two manners as illustrated in FIGS. 6a and 6b. In the manner shown in FIG. 6a, fuel injection is started (The fuel injection starting timing is indicated at $\theta 1$ in FIG. 6.) immediately after the intake valve 3 is closed upon completion of the preceding intake stroke (i.e. from the time IO when the intake valve 3 begins to open before the top dead center TDC to the time IC when tne intake valve 3 is closed after the bottom dead center BDC), and is terminated (The fuel injection terminating timing is indicated at $\theta 2$ in FIG. 6.) a time corresponding to the fuel injection pulse width after the fuel injection is started. In other words, in the manner shown in FIG. 6a, the fuel injection starting timing $\theta 1$ is fixed at a time immediately after the intake valve 3 is closed in the preceding intake stroke and the fuel injection terminating timing $\theta 2$ is advanced or retarded as the fuel injection amount changed. On the other hand, in the manner shown in FIG. 6b, the fuel injection terminating timing $\theta 2$ is fixed at a time in the first half of the intake stroke and then the fuel injection starting timing $\theta 1$ is determined according to the fuel injection pulse width or the amount of fuel to be injected. That is, the fuel injection starting timing $\theta 1$ is advanced or retarded as the fuel injection amount changes.

Thus, fuel is introduced into the combustion chamber 2 relatively early in the intake stroke and is accumulated in the lower portion of the combustion chamber 2. The fuel accumulated in the lower portion of the combustion chamber 2 is prevented from being scattered by a swirling motion given to the intake air. Further, since the spark plug 20 is positioned in the path of the squish flow, the spark plug 20 can be provided with rich mixture when ignited even if squish flow is produced and disturbs the stratification.

Figure 7B:
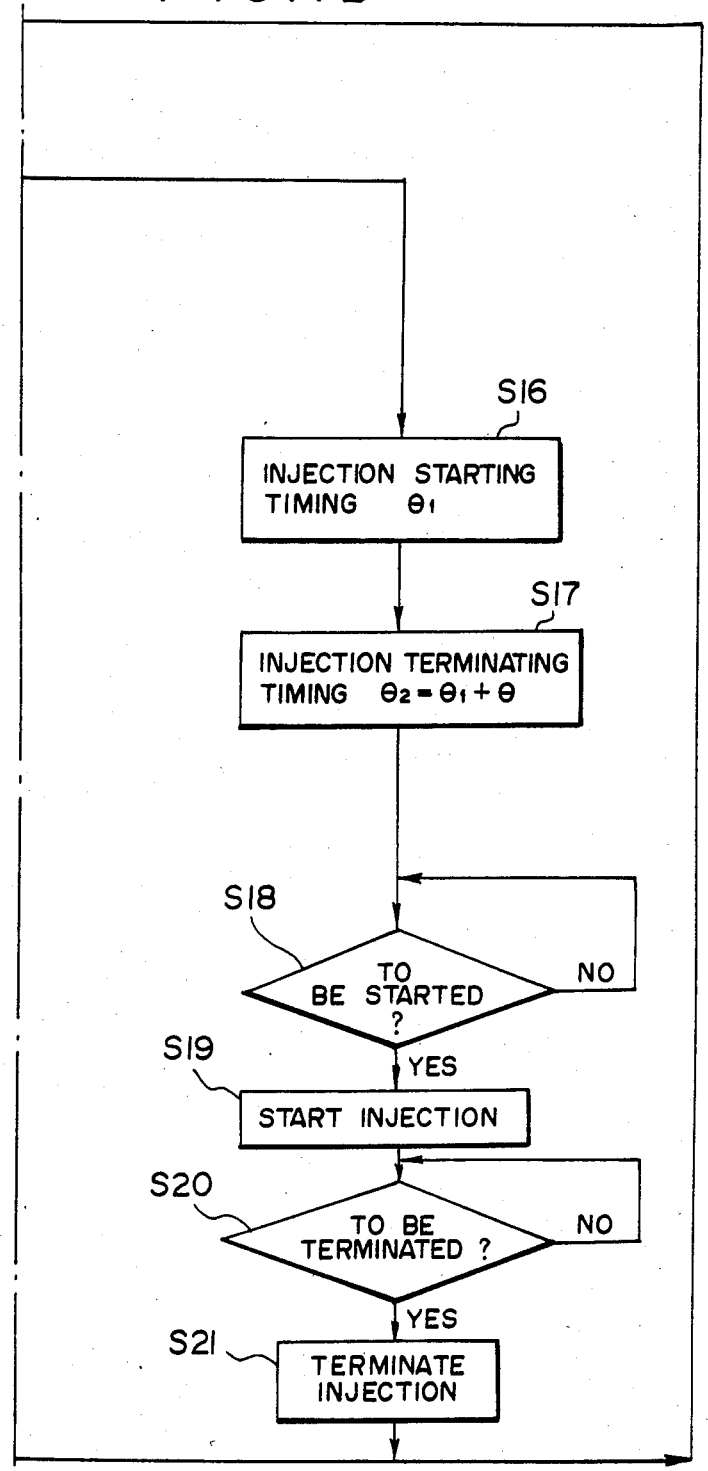

FIG. 7 is a flow chart for illustrating the operation of the CPU 27 of the control device 25.

When the engine 1 is started, the CPU 25 reads signals from the crankshaft sensor 32, the airflow meter 10, the coolant temperature sensor 29, the throttle position sensor 30 and the swirl-control-valve-position sensor 31 and stores the values of the signals in registers T, A, W1, V and K, respectively. (Steps S1 to S5) Then the CPU 27 determines whether or not the engine 1 is being started in step S6. When it is determined that the engine 1 is being started, the CPU 27 proceeds to step S7 and stores a predetermined starting fuel injection amount $\beta$ in a register I. In step S8, the CPU 27 produces a starting injection pulse according to the value of the register I and delivers the starting injection pulse to one of the fuel injection valves 12 which is determined by way of a TDC signal of the first cylinder. Thereafter, the CPU 27 returns to the step S1. Upon starting of the engine, as the fuel injection amount cannot be determined on the basis of the amount of intake air, a starting injection pulse having a predetermined width is generated.

After the engine 1 is started, the CPU 27 proceeds to step S9. In the step S9 the CPU 27 calculates the engine rpm based on the crankshaft angle stored in the register T and stores it in a register R. Then, in step S10, the CPU 27 calculates a fundamental fuel injection amount on the basis of the engine rpm stored in the register R and the amount of intake air stored in the register A, and stores it in the register I. In step S11, the CPU 27 calculates the acceleration dV/dt based on the contents of the register V, and determines whether or not the acceleration dV/dt is larger than a preset value $\alpha$, thereby determining whether or not the vehicle is being accelerated. When it is determined that the vehicle is being accelerated, the CPU 27 proceeds to step S12 and stores a preset value $\beta 1$ in a register C2. Otherwise, the CPU 27 proceeds to step S13 and nullifies the value of the register C2. Said preset valve $\beta 1$ may be a fixed value or may be changed according to the extent of the acceleration. In the next step S14, the CPU 27 compares the engine coolant temperature stored in the register W1 with a preset value W0, e.g. 60°, and when the engine coolant temperature is lower than the preset value W0, the CPU 27 multiplies the difference therebetween (W0–W1) by a correction coefficient to obtain a temperature correction amount, and adds the temperature correction amount thus obtained and the value in the register C2 as the acceleration correction amount to the fundamental fuel injection amount stored in the register I, thereby obtaining an actual fuel injection amount. Therefore, the actual fuel injection amount, i.e. I+C1(W0–W1)+C2, is stored in the register I. Then in step S15, the CPU 27 determines a fuel injection crankshaft angle $\theta$ on the basis of the actual fuel injection amount stored in the register I and stores it in a register $\theta$. Then in step S16, the fuel injection starting timing $\theta 1$ is obtained from a map in which the fuel injection starting timing $\theta 1$ is related to the operating conditions so that fuel injection can be terminated before the middle of the intake stroke even when the fuel injection amount is the maximum. Thereafter, in step S17, the fuel injection terminating timing $\theta 2$ is determined according to the actual fuel injection amount $\theta$ stored in the register $\theta$. Then the CPU 27 stays in step S18 until the fuel injection starting timing $\theta 1$ comes. At the fuel injection starting timing $\theta 1$, the CPU 27 delivers a "1" signal to the fuel injection valve 12 in step S19, and stays in step S20 until the fuel injection terminating timing $\theta 2$. When the fuel injection terminating timing $\theta 2$ comes, the CPU 27 terminates output of the "1" signal in step S21 and then returns to the step S1.

Thus, in the internal combustion engine 1 of this embodiment, the fundamental fuel injection amount is determined according to the engine rpm and the amount of intake air, and the actual fuel injection amount is determined by correcting increasing the fundamental fuel injection amount when the engine 1 is cold and/or being accelerated. Then the fuel injection starting timing and the fuel injection terminating timing are determined according to the actual fuel injection amount.

Though in the above embodiment, the amount of fuel to be injected is controlled according to the engine speed and the amount of intake air by changing the fuel injection period, the amount of fuel to be injected may be controlled by changing both the fuel injection period and the fuel pressure imparted to the fuel injection valve.

Though in the swirl controlling device 21 described above, the swirl is controlled by changing the ratio of the amount of intake air flowing through the primary intake passage 5a to that flowing through the secondary intake passage 5b by controlling the swirl control valve 24, other various known swirl controlling devices may be used instead. Further, though the swirling motion of intake air is changed stepwise in the above embodiment, it may be continuously changed with change in the operating condition.

As can be understood from the description above, fuel is accumulated in the lower portion of the combustion chamber in accordance with the present invention. Therefore, production of the swirling motion of intake air is not so critical in the fuel injection system of the present invention as in the prior art injection systems in which fuel is accumulated in the upper portion of the combustion chamber. However, it is preferred that the swirling motion of intake air be produced in order to positively obtain stratification of fuel and air.

We claim:

1. In a method of fuel injection for an internal combustion engine having a combustion chamber comprising a main chamber defined by a recess formed in the lower face of a cylinder head opposed to the top surface of a piston and a squish zone which is a narrow space formed between the top surface of the piston in the top dead center positon and a part of the lower face of the cylinder head around the recess, and an intake passage communicating with the combustion chamber by way of an intake port adapted to be opened and closed by an intake valve, the improvement which comprises injecting fuel into the intake passage near the intake port,
controlling said fuel injection, at least when the engine load is low, to inject fuel by an amount required for one power stroke and to terminate fuel injection by the middle of the intake valve opening time at the latest so that a rich mixture of air and fuel is accumulated in the lower portion of the combustion chamber and a lean mixture thereof in the upper portion of the same,
and igniting said rich mixture in the path of squish flow.

2. In a fuel injection system for an internal combustion engine having a combustion engine chamber comprising a main chamber defined by a recess formed in the lower face of a cylinder head opposed to the top surface of a piston and a squish zone which is a narrow space formed between the top surface of the piston in the top dead center position and a part of the lower face of the cylinder head around the recess, and an intake passage communicating with the combustion chamber by way of an intake port adapted to be opened and closed by an intake valve, the improvement which comprises a fuel injection valve positioned in the intake passage near the intake port and adapted to inject fuel into the intake passage, a control means which controls said fuel injection valve, at least when the engine load is low, to inject fuel by an amount required for one power stroke and to terminate fuel injection by the middle of the intake valve opening time at the latest so that a rich mixture of air and fuel is accumulated in the lower portion of the combustion chamber and a lean mixture thereof in the upper portion of the same, and a spark plug disposed in the path of squish flow with said rich mixture so that the spark plug is provided with said rich mixture when ignited.

3. A fuel injection system as defined in claim 2 in which said intake port opens in said squish zone, said fuel injection valve is disposed in the direction of said intake port, and fuel injection from said injection valve is substantially conducted in the first half of the intake stroke where the intake valve is opened.

4. A fuel injection system as defined in claim 2 further comprising a swirl producing means which gives intake air a swirling motion in the circumferential direction of the cylinder forming the combustion chamber at least when the engine load is low.

5. A fuel injection system as defined in claim 4 further comprising a swirl control means which weakens the swirling motion to be given to intake air when the engine operates at high-load high-speed.

6. A fuel injection system as defined in claim 2 in which said control means controls the fuel injection valve to start fuel injection before the intake valve is opened.

7. A fuel injection system as defined in claim 6 in which said control means controls the fuel injection valve to terminate fuel injection before the intake valve is opened.

8. A fuel injection system as defined in claim 2 in which the top surface of the piston is substantially flat, a single intake valve and a single exhaust valve are provided, an intake port opens in said squish zone, an exhaust port opens in the main combustion chamber, and the intake passage communicated with intake port comprises a primary intake passage through which at least a part of the intake air is introduced into the combustion chamber over the whole operating range of the engine and a secondary intake passage provided with a control valve which limits flow of intake air passing through the secondary intake passage at least when the engine load is low, the primary intake passage being position below the secondary intake passage and opening to the intake port so that the intake air is introduced into the combustion chamber substantially in a horizontal direction and the fuel injection valve being disposed in the direction of the intake port.

9. A fuel injection system as defined in claim 8 in which said fuel injection valve is disposed downstream from the control valve of the secondary passage.

10. A fuel injection system as defined in claim 2 in which said squish zone is relatively large and circumscribes at least one of the intake and exhaust valves.

11. A fuel injection system as defined in claim 10 further comprising a swirl control means which gives intake air a swirling motion in the circumferential direction of the cylinder forming the combustion chamber at least when the engine load is low and weakens the swirling motion to be given to intake air at least when the engine operates at high-load high-speed.

12. A fuel injection system as defined in claim 11 in which an intake port for introducing intake air into the cylinder in the circumferential direction thereof in order to produce the swirling motion of the intake air opens in said squish zone.

13. A fuel injection system as defined in claim 12 in which a shallow recess is formed in the squish zone at a position near said recess defining the main combustion chamber and downstream of the same as seen in the direction of the swirling motion of the intake air, and said spark plug is disposed in the shallow recess, the shallow recess merging into the recess defining the main combustion chamber.

* * * * *